US007820273B2

(12) United States Patent
Chou et al.

(10) Patent No.: US 7,820,273 B2
(45) Date of Patent: Oct. 26, 2010

(54) SUBSTRATE STRUCTURE WITH PATTERNED LAYER

(75) Inventors: Ching-Yu Chou, Taipei Hsien (TW); Yu-Ning Wang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 413 days.

(21) Appl. No.: 11/557,922

(22) Filed: Nov. 8, 2006

(65) Prior Publication Data

US 2007/0238214 A1 Oct. 11, 2007

(30) Foreign Application Priority Data

Apr. 7, 2006 (TW) .............................. 95112507 A

(51) Int. Cl.
*B32B 27/00* (2006.01)

(52) U.S. Cl. .................... 428/195.1; 428/204; 428/207; 428/411.1

(58) Field of Classification Search ................. 428/690, 428/195.1, 204, 207, 411.1; 438/52; 313/504, 313/503, 506; 427/66, 314
See application file for complete search history.

(56) References Cited

U.S. PATENT DOCUMENTS

| | | | | |
|---|---|---|---|---|
| 6,630,274 | B1 * | 10/2003 | Kiguchi et al. | 430/7 |
| 6,844,120 | B2 | 1/2005 | Chen et al. | |
| 6,967,352 | B2 * | 11/2005 | Yudasaka | 257/79 |
| 7,070,890 | B2 * | 7/2006 | Kiguchi et al. | 430/7 |
| 7,132,788 | B2 * | 11/2006 | Gupta et al. | 313/504 |
| 7,514,187 | B2 * | 4/2009 | Kiguchi et al. | 430/7 |
| 2003/0076457 | A1 | 4/2003 | Bae et al. | |
| 2006/0066779 | A1 | 3/2006 | Kobayashi et al. | |

FOREIGN PATENT DOCUMENTS

| | | |
|---|---|---|
| JP | 7234314 | 9/1995 |
| JP | 2000162428 | 6/2000 |
| JP | 2003128966 | 5/2003 |
| JP | 2005-352105 A | 12/2005 |
| JP | 2005352105 | 12/2005 |
| KR | 2000-0071813 | 11/2000 |

* cited by examiner

*Primary Examiner*—Patricia L Nordmeyer
*Assistant Examiner*—Lawrence D Ferguson
(74) *Attorney, Agent, or Firm*—Jeffrey T. Knapp

(57) ABSTRACT

A substrate structure includes a substrate, a number of banks formed on the substrate, and a patterned layer. The banks and the substrate cooperatively define a number of accommodating rooms. The accommodating rooms are configured for accommodating ink. The patterned layer covers the bank between at least two adjacent accommodating rooms.

8 Claims, 9 Drawing Sheets

SUBSTRATE STRUCTURE WITH PATTERNED LAYER

TECHNICAL FIELD

The present invention relates to a substrate structure with a patterned layer and a method for manufacturing the same.

BACKGROUND

Methods for manufacturing a substrate structure with a patterned layer mainly include a photolithography method and an inkjet method.

The photolithography method includes the steps of: providing a substrate; applying a photoresist film onto the substrate; exposing the photoresist film using a photomask with a predetermined pattern; and developing the photoresist film to form a patterned layer. However, a large part of the photoresist material is wasted and the efficiency is low as a result, thus increasing the cost.

The ink jet method includes the steps of: providing a substrate with a plurality of banks, the substrate and the banks cooperatively defining a plurality of accommodating rooms; dispensing ink into the accommodating rooms on the substrate; solidifying the ink to form a patterned layer. In the ink jet method, the efficiency of use of the material is increased.

In the ink jet method, the ink is only dispensed into the accommodating rooms. The ink is still in a liquid state when the ink is dispensed into the accommodating rooms. When the ink contacts with the banks, the ink climbs up along the banks because of the force driven by surface energy difference between the ink and the banks. When the ink is solidified, the patterned layer has uneven thicknesses as a result.

It is therefore desirable to find a new substrate structure and a new method which can overcome the above mentioned problems.

SUMMARY

In a preferred embodiment, a substrate structure includes a substrate, a plurality of banks formed on the substrate, and a patterned layer. The banks and the substrate cooperatively define a plurality of accommodating rooms. The patterned layer is placed in accommodating rooms and covers portions of the banks located between at least two adjacent accommodating rooms.

Other advantages and novel features will become more apparent from the following detailed description of the present substrate structure and the present method, when taken in conjunction with the accompanying drawings.

BRIEF DESCRIPTION OF THE DRAWINGS

Many aspects of the present substrate structure and the present method can be better understood with reference to the following drawings. The components in the drawings are not necessarily drawn to scale, the emphasis instead being placed upon clearly illustrating the principles of the present substrate structure and the present method.

Reference numbers indicate corresponding parts throughout the drawings. The exemplifications set out herein illustrate at least one preferred embodiment of the invention, in one form, and such exemplifications are not to be construed as limiting the scope of the invention in any manner.

DETAILED DESCRIPTION OF THE EMBODIMENTS

Reference will now be made to the drawings to describe the preferred embodiments of the present substrate structure and the present method in detail.

Referring to FIGS. 1 to 4, a substrate structure 120 is shown in accordance with a first embodiment. The substrate structure 120 includes a substrate 100, a plurality of banks 106, and a patterned layer 110. The banks 106 are formed on the substrate 100. The banks 106 have a same height. The substrate 100 and the banks 106 cooperatively define a plurality of accommodating rooms (not labeled) arranged in rows and columns. The patterned layer 110 includes a plurality of stripes, each filling at least two adjacent accommodating rooms in each column (i.e., in a Y direction in a Cartesian co-ordinate system) and covering portions of the banks 106 located between the at least two adjacent accommodating rooms in each column. Portions of the banks 106 located between adjacent accommodating rooms in each row (i.e., in an X direction in a Cartesian co-ordinate system) are free of stripes formed thereon. The patterned layer 110 is higher than the banks 106.

Figure 1:
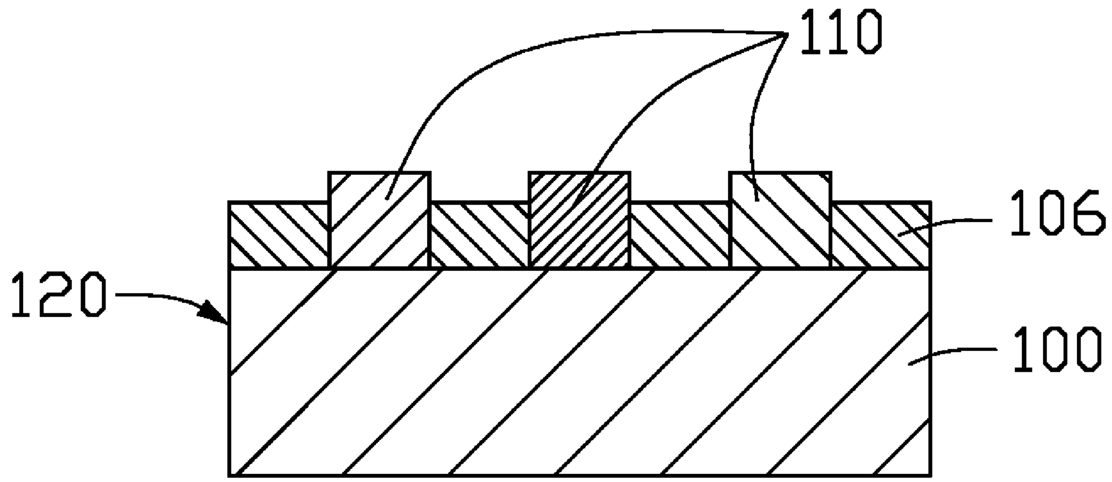
FIG. 1 is a schematic, cross-sectional view of a substrate structure in accordance with a first embodiment.
Figure 2:
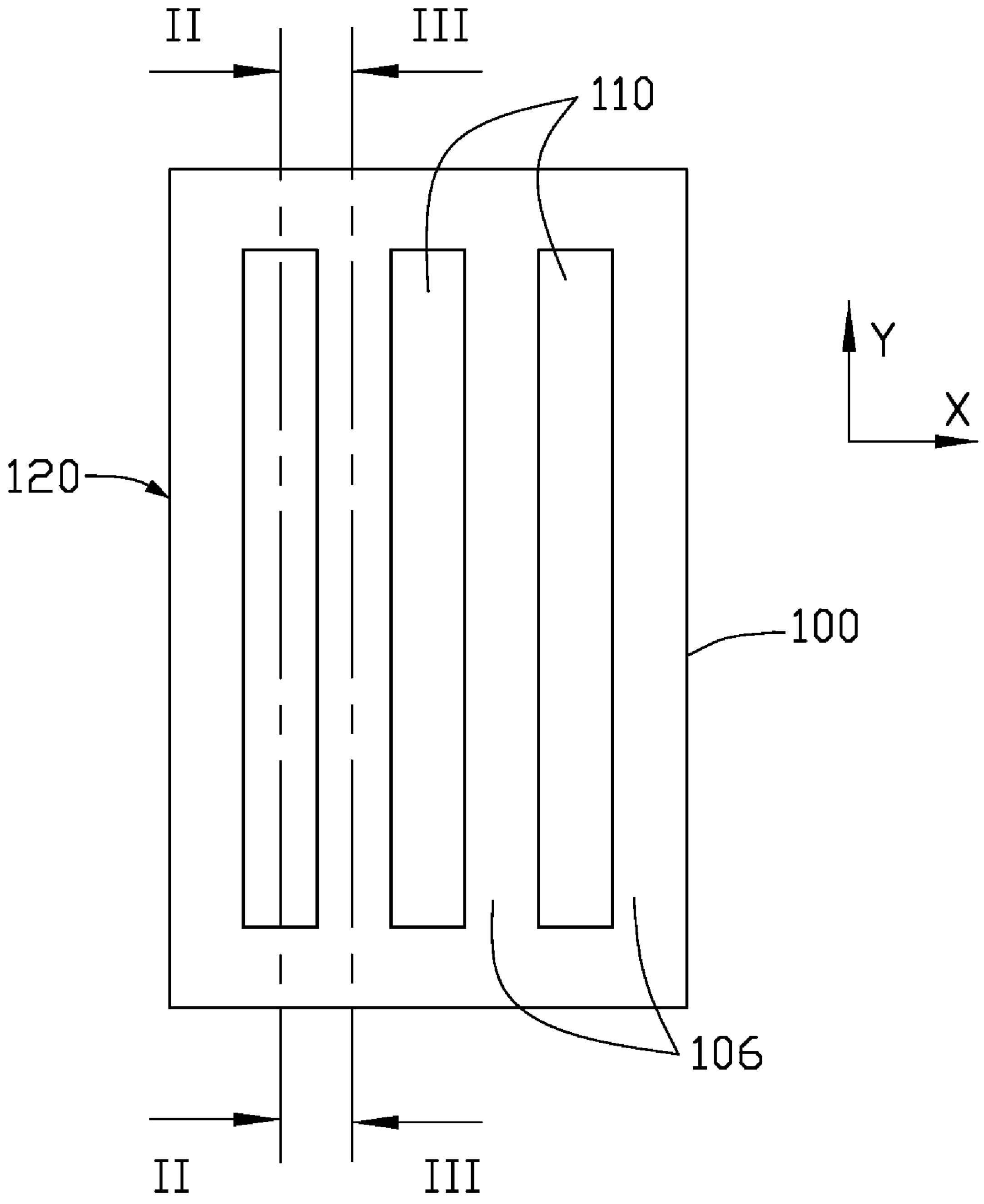
FIG. 2 is a schematic, plan view of the substrate structure of FIG. 1.
Figure 3:
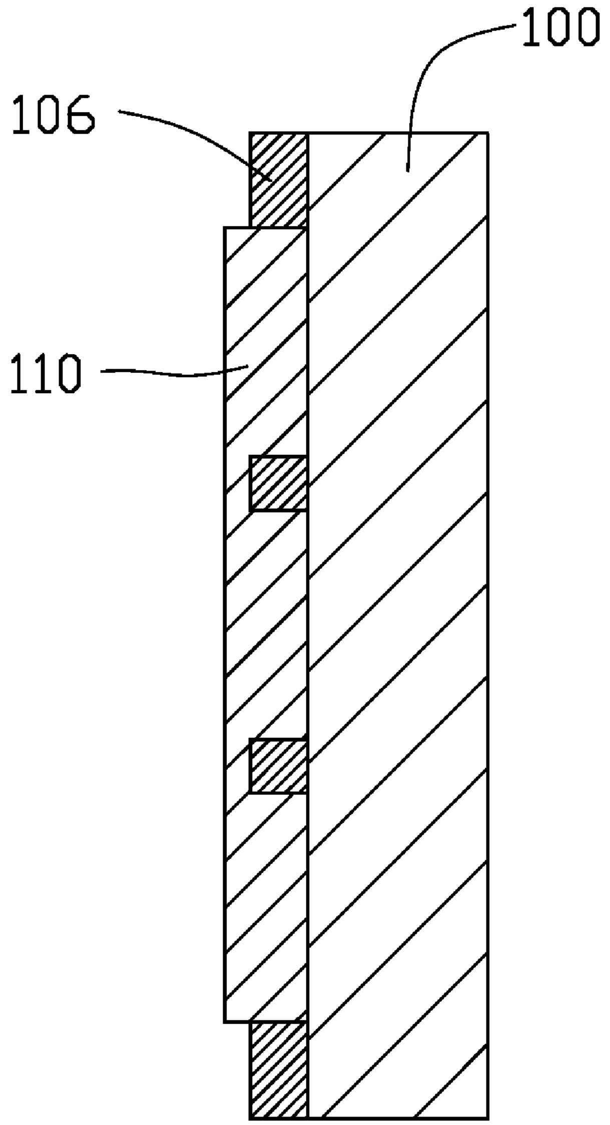
FIG. 3 is a schematic, cross-sectional view of the substrate structure of FIG. 2, taken along the line II-II thereof.
Figure 4:
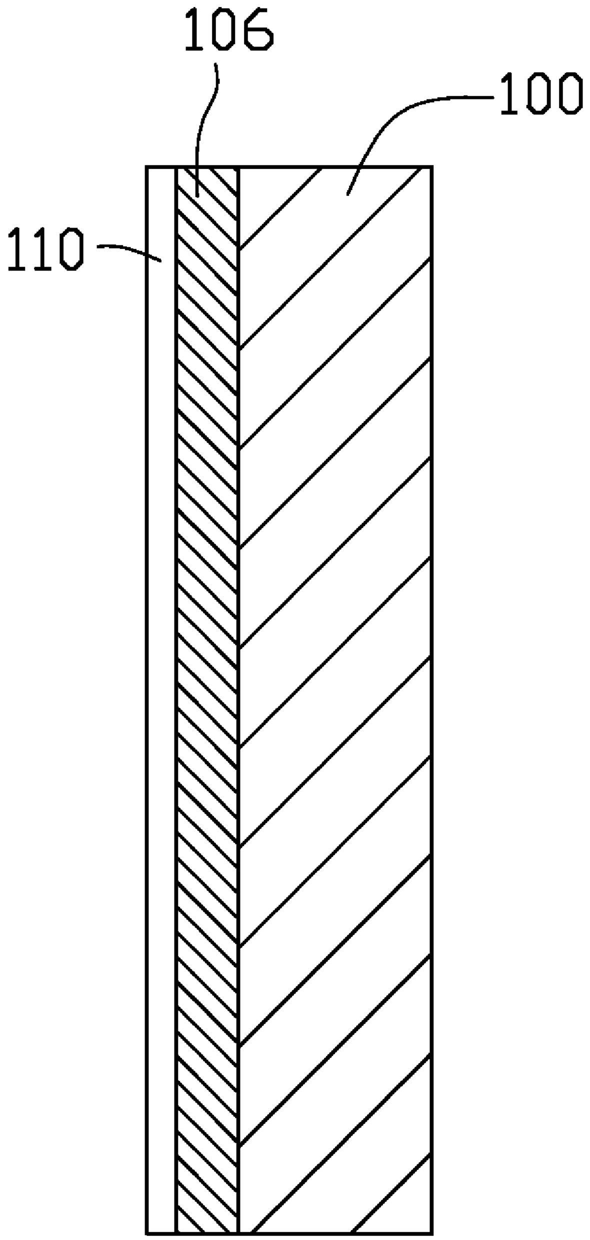
FIG. 4 is a schematic, cross-sectional view of the substrate structure of FIG. 2, taken along the line III-III thereof.
Figure 5:
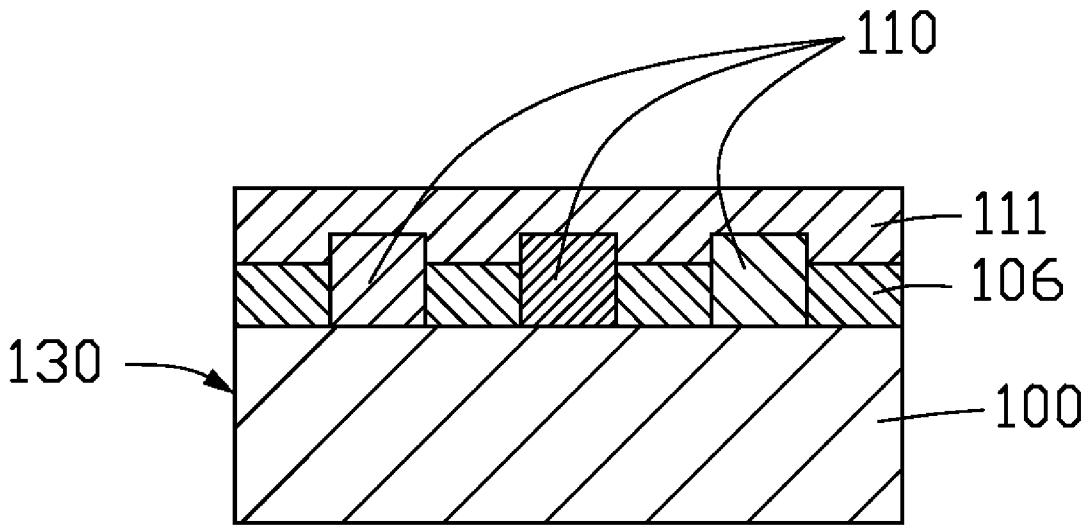
FIG. 5 is a schematic, cross-sectional view of a substrate structure in accordance with a second embodiment.

Referring to FIG. 5, a substrate structure 130 is shown in accordance with a second embodiment. The substrate structure 130 is similar to the substrate structure 120, but further includes an overcoat layer 111 covering the banks 106 and the patterned layer 110. The overcoat layer 111 is configured (i.e., structured and arranged) for protecting the patterned layer 110 and improving the smoothness of the surface of the patterned layer 110. The overcoat layer 111 can be made of polymeric material selected from the group consisting of epoxy resin series, acrylic resin series, polyimide resin series, and polyvinyl alcohol resin series.

Figure 6:
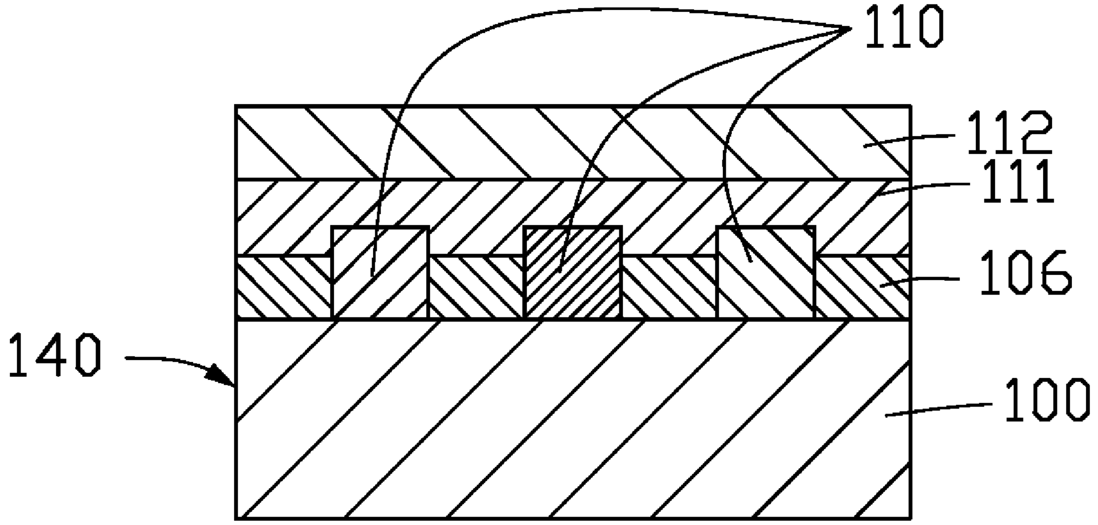
FIG. 6 is a schematic, cross-sectional view of a substrate structure in accordance with a third embodiment.

Referring to FIG. 6, a substrate structure 140 is shown in accordance with a third embodiment. The substrate structure 140 is similar to the substrate structure 130, but includes an electrically conductive layer 112 covering the overcoat layer 111. The conductive layer 112 can be a transparent conductive layer or a metal conductive layer. The transparent conductive layer can be selected from the group consisting of an indium tin oxide film, an indium zinc oxide film, a cadmium tin oxide film, and an zinc oxide film, and the metal conductive layer can be an aluminum film.

It should be noted that the conductive layer 112 can be directly formed to cover the banks 106 and the patterned layer 110.

A method for manufacturing a substrate structure mainly includes the following steps:

(1) providing a substrate;

(2) forming a plurality of banks on the substrate, the banks and the substrate cooperatively defining a plurality of accommodating rooms;

(3) dispensing ink into accommodating rooms in such a manner that the ink covers the bank located between at least two adjacent accommodating rooms using a dispenser;

(4) solidifying the ink in the accommodating rooms to form a patterned layer;

(5) optionally, forming an overcoat layer covering the banks and the patterned layer; and (6) optionally, forming an electrically conductive layer on the overcoat layer.

Figure 7:
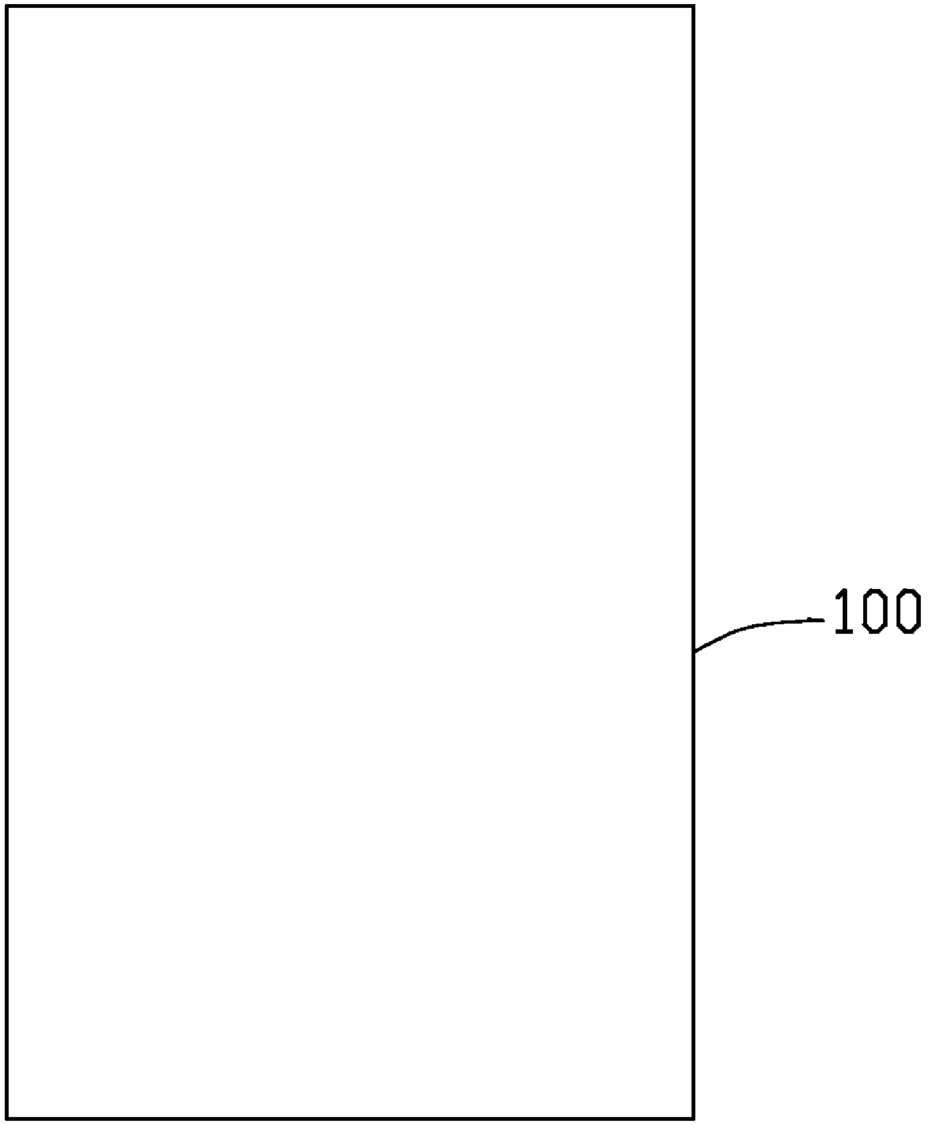
FIGS. 7 to 9 are schematic, plan views illustrating successive stages of a method for manufacturing the substrate structure of FIG. 1.
Figure 8:
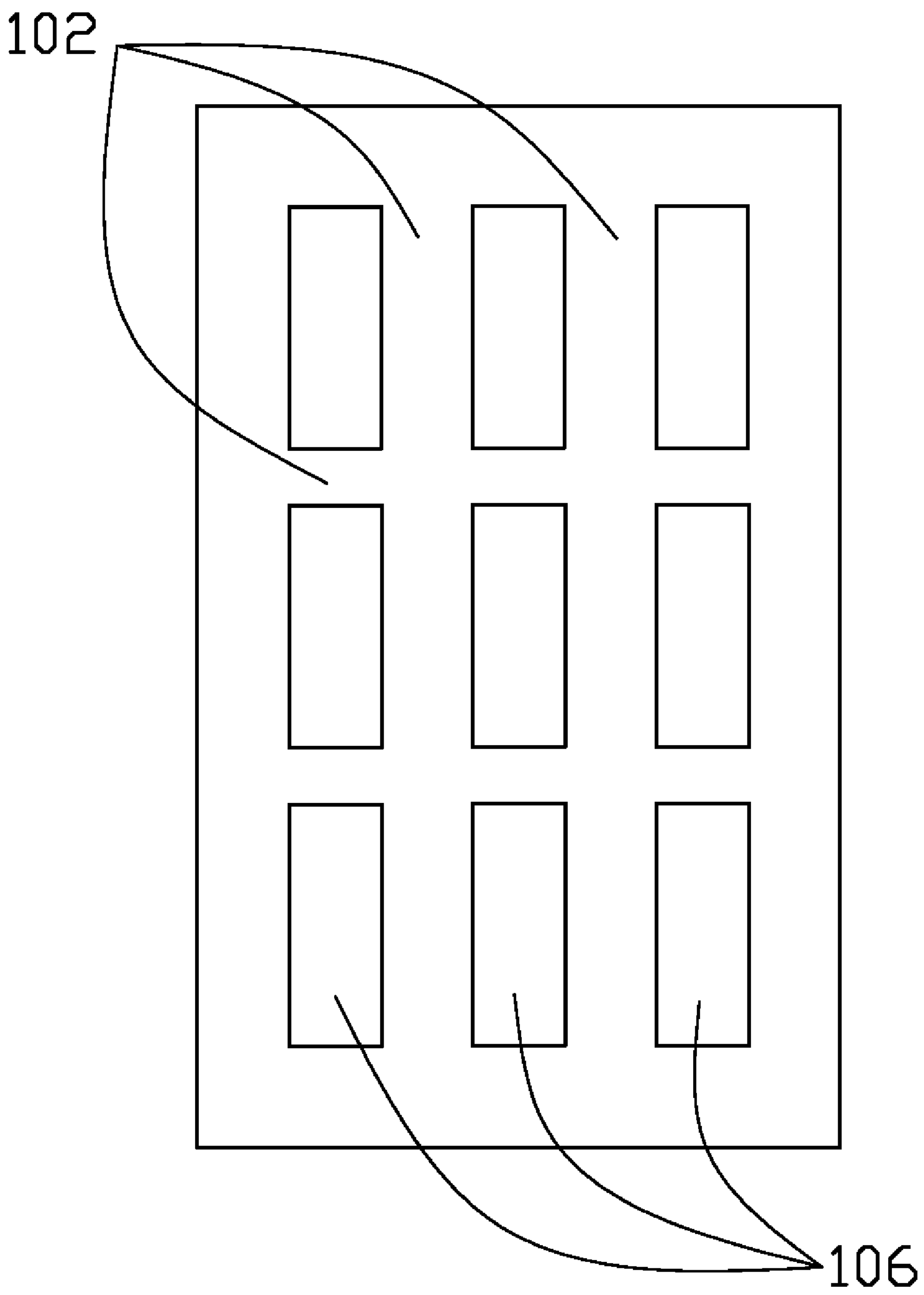
Figure 9:
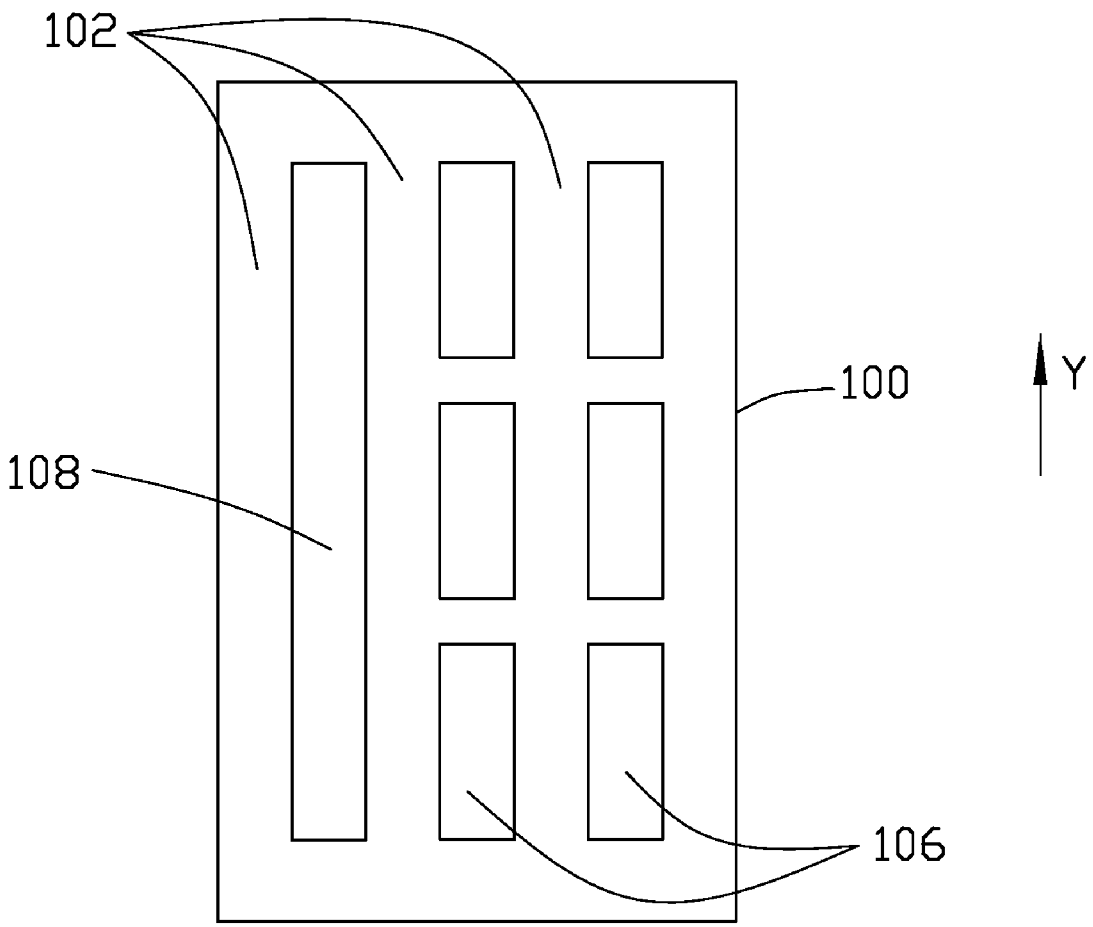

With reference to FIGS. 7 to 9, the method for manufacturing the substrate structure 140 is described in more detail.

In step 1, a substrate 100 is provided, referring to FIG. 7. A material of the substrate 100 can be selected from the group consisting of: glass, quartz glass, silicon, metal, and plastic. The substrate 100 is made of glass in this embodiment.

In step 2, a plurality of banks 102 are formed on the substrate 100, referring to FIG. 8. The banks 102 and the substrate 100 cooperatively define a plurality of accommodating rooms 106. The banks 102 can be made of resin and be formed using photolithography. The banks 102 are of roughly equal height.

In step 3, ink 108 is dispensed into the accommodating rooms 106 in such a manner that the ink 108 covers the bank 102 located between at least two adjacent accommodating rooms 106 in a Y direction using a dispenser, referring to FIG. 9. Accordingly, an amount of the ink in each strip is roughly same. The dispenser can be an ink jet device, for example, a thermal bubble ink jet device, or a piezoelectric ink jet device.

In step 4, the ink 108 is solidified to form a patterned layer 110, referring to FIGS. 1 to 4. The ink 108 is solidified using at least one device chosen from the group consisting of a vacuumizing device, a heating device and a light-emitting device. The light-emitting device includes an ultraviolet light-emitting device. The patterned layer 110 can be thicker than the banks and covers the bank 102 located between at least two adjacent accommodating rooms 106.

In step 5, an overcoat layer is optionally formed covering the banks 102 and the patterned layer 110, as seen in FIG. 5.

In step 6, an electrically conductive layer 112 is optionally formed on the overcoat layer 111, as seen in FIG. 6.

It should be noted that the conductive layer 112 can be directly formed covering the banks 106 and the patterned layer 110.

In the above method for manufacturing the substrate structure, ink is dispensed into the accommodating rooms in such a manner that the ink covers the bank located between at least two adjacent accommodating rooms. Accordingly, an amount of the ink in each strip is roughly same. Therefore, the patterned layer is more even after the ink is solidified. The substrate structure manufactured using the method is also more even.

It should be noted that the substrate structure can be devices such as, for example, color filters and organic light emitting display devices. The method for manufacturing the substrate structure can be used to manufacture the above-mentioned devices. In the manufacturing of color filters, the method can be used to manufacture RGB (red, green, and blue) color layers. Correspondingly, the bank mentioned above can include single layer banks (using black matrix only as the bank), or multi-layer banks (using black matrix and one or more top layers on the black matrix as the bank). This method can also be used to manufacture, for example, emission-material layers, electron-transfer layers, hole-transfer layers and electron-ejection layers.

When the substrate structure is a color filter, the occurrence of blank areas (i.e., leakage of light through the transparent area) is decreased due to the continuous color layers. Thus a display device using the color filter has a higher contrast and a higher color purity.

Although the present invention has been described with reference to specific embodiments, it should be noted that the described embodiments are not necessarily exclusive, and that various changes and modifications may be made to the described embodiments without departing from the scope of the invention as defined by the appended claims.

What is claimed is:

1. A substrate structure, comprising:

a substrate;

a plurality of banks formed on the substrate, the banks and the substrate cooperatively defining a plurality of accommodating rooms; and a patterned layer formed by solidified ink, being placed in the accommodating rooms;

wherein the patterned layer is thicker than the banks, thus covering portions of the banks located between at least two adjacent accommodating rooms, and the substrate structure further comprises an overcoat layer covering the banks and the patterned layer.

2. The substrate structure as claimed in claim 1, wherein a material of the substrate is selected from the group consisting of glass, quartz glass, silicon, metal and plastic.

3. The substrate structure as claimed in claim 1, wherein a material of the banks is resin.

4. The substrate structure as claimed in claim 1, further comprising an electrically conductive layer covering the banks and the patterned layer.

5. The substrate structure as claimed in claim 1, further comprising an electrically conductive layer covering the overcoat layer.

6. The substrate structure as claimed in claim 1, wherein the banks have equal heights.

7. A substrate structure, comprising:

a substrate;

a plurality of banks formed on the substrate, the banks and the substrate cooperatively defining a plurality of accommodating rooms, the accommodating rooms being arranged in rows and columns; and a patterned layer formed on the substrate, the patterned layer being formed by solidified ink and comprising a plurality of stripes each filling at least two adjacent accommodating rooms in each column, wherein the patterned layer is thicker than the banks, thus covering portions of the banks located between the at least two adjacent accommodating rooms in each column, and the substrate structure further comprises an overcoat layer covering the banks and the patterned layer.

8. The substrate structure as claimed in claim 7, wherein portions of the banks located between adjacent accommodating rooms in each row are free of stripes formed thereon.

* * * * *